United States Patent
Asahara

(10) Patent No.: US 8,090,784 B2
(45) Date of Patent: Jan. 3, 2012

(54) NETWORK SYSTEM AND TERMINALS CONNECTED THERETO

(75) Inventor: Tatsuya Asahara, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 256 days.

(21) Appl. No.: 12/181,968

(22) Filed: Jul. 29, 2008

(65) Prior Publication Data

US 2009/0037525 A1    Feb. 5, 2009

(30) Foreign Application Priority Data

Jul. 31, 2007 (JP) ................................. 2007-199561

(51) Int. Cl.
*G06F 15/16* (2006.01)

(52) U.S. Cl. ........................................ 709/206; 709/227

(58) Field of Classification Search .................. 709/203, 709/227, 228, 206
See application file for complete search history.

(56) References Cited

U.S. PATENT DOCUMENTS

| | | | |
|---|---|---|---|
| 6,175,918 B1* | 1/2001 | Shimizu | 709/222 |
| 6,628,299 B2 | 9/2003 | Kitayama | |
| 6,678,715 B1* | 1/2004 | Ando | 709/205 |
| 6,973,434 B2* | 12/2005 | Miller | 705/2 |
| 7,161,561 B2 | 1/2007 | Kitayama | |
| 7,496,579 B2* | 2/2009 | Garbow et al. | 707/999.01 |
| 7,584,243 B2* | 9/2009 | Fujiki et al. | 709/203 |
| 7,698,437 B2* | 4/2010 | Stogel et al. | 709/227 |
| 2004/0133689 A1* | 7/2004 | Vasisht | 709/228 |
| 2005/0108408 A1* | 5/2005 | Ookubo | 709/228 |
| 2005/0198132 A1* | 9/2005 | Vellante et al. | 709/204 |
| 2008/0317049 A1* | 12/2008 | Sinicrope et al. | 370/401 |

FOREIGN PATENT DOCUMENTS

JP    3-206535 A    9/1991

* cited by examiner

*Primary Examiner* — Minh-Chau Nguyen
(74) *Attorney, Agent, or Firm* — Birch, Stewart, Kolasch & Birch, LLP

(57) ABSTRACT

A network system is provided with a plurality of terminals connected thereto, each of the terminals being configured to be connectable to a network and switchable between server mode and client mode. Each of the terminals includes a terminal information registration unit and a comparison information storage unit, and the terminal information registration unit stores information on each other terminal connected to the network as well as information on whether each other terminal is a server terminal or a client terminal. The comparison information storage unit stores comparison information used for server selection. In a server selection process, at least one of the terminals compares pieces of the comparison information stored in the comparison information storage units of the individual terminals through terminal-to-terminal communication and, depending on the result of comparison, one of the terminals to which priority is given is selected to work as the server terminal.

8 Claims, 6 Drawing Sheets

NETWORK SYSTEM AND TERMINALS CONNECTED THERETO

CROSS REFERENCE OF RELATED APPLICATION

Japanese Patent Application tokugan No. 2007-199561 is hereby incorporated by reference.

BACKGROUND OF THE INVENTION

1. Field of the Invention

The present invention relates generally to a network system which enables data sharing using a client/server architecture and, more particularly, pertains to terminals connected to such a network system.

2. Description of the Related Art

In the marine electronics industry, a network system which permits sharing of such data as destination data and route data among various onboard apparatuses connected to the network system is conventionally known. The apparatuses connected to the network system may include a course plotter, a Global Positioning System (GPS) receiver, a radar and an echo sounder, for example. A client/server system is one form of this kind of network system, in which a server manages shared data which will be provided to a client on request.

Japanese Patent Application Publication No. 1991-206535 introduces an example of a data sharing method usable in a client/server system. The client/server system disclosed in this Publication is a generally applicable network system which is not limited to networking of apparatuses installed on a vessel. The Publication describes an information processing system including a file server for storing and managing shared files and a plurality of user terminals (clients) which are interconnected by a network, wherein the shared files are managed in a below-described manner. Specifically, the individual user terminals are provided with storage devices for storing files necessary for themselves whereas the file server is provided with file management means. Among the shared files stored in the file server, files required by the individual user terminals are transferred to the pertinent user terminals and stored in the storage devices thereof at first and, thereafter, the file management means of the file server manages the shared files in such a way that the files stored in the storage devices of the individual user terminals coincide with corresponding portions of the shared files. If any of the user terminals needs to access a particular shared file, the relevant user terminal accesses the file stored in the storage device of the same user terminal. According to the Publication, the client/server system thus configured permits high-speed access to the shared files.

The aforementioned client/server system of the Publication is configured based on the assumption that the file server and the user terminals would permanently serve as a server and clients, respectively. Practically, however, a client/server network may be configured such that each terminal connected to the network can work either as a server or as a client depending on situations. In this kind of client/server system, one terminal selected from a plurality of terminals connected to the network serves as a server while the other terminals work as clients at any given time. One benefit of this kind of client/server system is that if a failure occurs in the server, one of the clients can be selected as a new server, thus permitting uninterrupted data sharing. This client/server architecture makes it possible to create a flexible networking environment.

One approach to realizing the aforementioned flexible networking environment would be to configure the client/server system in such a way that a desired one of the terminals selected by a user by manual operation is set to operate as a server and the other terminals to work as clients, for instance. In this approach, client/server information managed by the individual terminals should include information on the terminal specified as the server and information on the terminals specified as the clients.

In this client/server architecture, the terminals set to work as the clients are allowed to access the terminal set to act as the server which manages data sharing among the individual terminals. In the following discussion of the present invention, the terminal acting as the server is referred to as the "server terminal" and the terminals working as the clients are referred to as the "client terminals."

In the network system thus configured, if a particular client terminal is powered on when the server terminal is not powered on, the client terminal will not be able to identify any server on the network. Data sharing will be impossible in such a situation, so that the pertinent client terminal presents a warning message to prompt the user to turn on the server terminal or carry out various settings once again.

Also, the network system may be reconfigured by adding a new terminal to the network or replacing an existing terminal with a new one, for example. The server terminal may be reset to work as a client or the server terminal may be powered off in a process of such network reconfiguration. Also, although only one terminal on the network should normally be set to act as the server, more than one terminal on the network might be set to act as servers due to an error in user setting, for instance.

Since the network system can not correctly operate in such situations, the server and client terminals would present warning messages and it is considerably complex and difficult for the user to cope with such warning messages.

SUMMARY OF THE INVENTION

In light of the aforementioned problems of the prior art, it is an object of the invention to provide terminals which make it possible to eliminate complexity in server selection and settings in a network system and to flexibly cope with situations encountered due to a power on/off state of a particular terminal or a change in network configuration.

To solve the aforementioned problems of the prior art, the invention provides a network system and terminals connected thereto, of which configuration, features and advantages are briefly described hereunder.

In one principal feature of the invention, a terminal is configured to be connectable to a network together with at least one other terminal having a like configuration and switchable between server mode in which the terminal works as a server which transmits shared data to a client and client mode in which the terminal works as a client which receives the shared data from the server.

The terminal comprises a terminal information registration unit for storing information on the other terminal connected to the network as well as information on whether the other terminal is a server terminal working as the server or a client terminal working as a client, and a comparison information storage unit for storing comparison information used in a server selection process for selecting the server terminal. At least one of the terminals compares pieces of the comparison information stored in the comparison information storage units of the individual terminals through terminal-to-terminal communication and, depending on the result of comparison of the pieces of the comparison information, one of the terminals to which first priority is given by the server selection process works as the server terminal and the other terminal works as a client terminal.

According to this arrangement, one terminal storing the comparison information to which first priority is given is automatically selected as the server terminal. This makes it unnecessary for a user to select the server from among a plurality of terminals by manually operating the individual terminals, thereby relieving the user of work load otherwise required for system setup and maintenance operations. Also, the user need not care whether one terminal is the server or a client. Furthermore, the aforementioned automatic server selection process serves to prevent network failures which may occur due to human errors in system settings, for instance.

In one aspect of the invention, if one of the terminals which has been working as the server terminal is disconnected from the network, the terminal which has been working as a client terminal compares the pieces of the comparison information stored in the comparison information storage units of the individual terminals still connected to the network through terminal-to-terminal communication and, then, one of the terminals to which priority is given by the server selection process switches from the client mode to the server mode to work as the server terminal.

According to this arrangement, even when the terminal which has been working as the server terminal is powered off or disconnected from the network due to a failure, for instance, the other terminals still connected to the network carry out terminal-to-terminal communication and the new server terminal is automatically selected. It is therefore unnecessary for the user to select the server by manual operation in this case as well.

In another aspect of the invention, if the terminal which has not been connected to the network is newly connected thereto, the terminal communicates with the terminal which has been working as the server terminal on the network, compares the pieces of the comparison information stored in the comparison information storage units of the individual terminals and takes over the role of the server terminal if it is found that priority is given to the newly connected terminal by the server selection process.

According to this arrangement, the terminal newly connected to the network communicates with the terminal (server terminal) to which priority has been given until the new terminal has been added to determine which one of the two terminals should work as the server terminal. This approach of the invention makes it possible to automatically select one terminal suited to work as the server in a proper and efficient way through a simple process of terminal-to-terminal communication and mathematical operation.

In another aspect of the invention, it is preferable that the comparison information be operating time of each of the terminals and priority be given to one of the terminals having longer operating time than any other terminal.

According to this arrangement, the server terminal is selected based on which one of the terminals has the longest operating time. Since a relationship between operating times of any two terminals remains unchanged as long as both terminals are kept on, this arrangement serves to prevent such a situation that the server terminal is unnecessarily replaced by another terminal. Typically, the more important a particular terminal, the longer the operating time of the terminal. It is therefore possible to select the server terminal in a rational way. Additionally, since the server terminal is selected by a simple comparison of the operating times of a plurality of terminals, it is possible to reduce computational complexity and communication complexity otherwise required at each terminal for performing the server selection process.

In another aspect of the invention, it is preferable that the comparison information be an Internet Protocol (IP) address of each of the terminals and priority be given to one of the terminals based on the result of comparison of IP address values.

According to this arrangement, the server terminal is selected based the IP addresses which, once assigned to the individual terminals, would rarely be altered. It is therefore possible to prevent such a situation that the server terminal is unnecessarily replaced by another terminal. Also, since the server terminal is selected by a simple comparison of the values of the IP addresses, it is possible to reduce computational complexity and communication complexity otherwise required at each terminal for performing the server selection process.

In still another aspect of the invention, it is preferable that the comparison information be a combination of operating time and IP address of each of the terminals, and priority be given to one of the terminals having longer operating time than any other terminal and, if a plurality of terminals have equally longer operating time than any other terminal, priority be given to one of the terminals based on the result of comparison of the IP address values.

According to this arrangement, the server terminal is selected based on the IP addresses if a plurality of terminals have the same system operating time. This approach makes it possible to select the server terminal in an appropriate fashion at all times.

In yet another aspect of the invention, it is preferable that the terminal further comprise an unshared data storage unit for storing data which need not be shared by the individual terminals.

This arrangement permits each terminal to store information which is used only by the relevant terminal. Accordingly, while the individual terminals store information which must be shared by all the terminals, the user can enter desired settings in each terminal and use that terminal in a flexible fashion without giving attention to the influence to the other terminals.

In another principal feature of the invention, a network system is provided with a plurality of terminals connected thereto, each of the terminals being configured to be connectable to a network and switchable between server mode in which the relevant terminal works as a server which transmits shared data to a client and client mode in which the relevant terminal works as a client which receives the shared data from the server, wherein only one of the terminals is selected to work as the server. Each of the terminals comprises a terminal information registration unit and a comparison information storage unit. The terminal information registration unit stores information on each other terminal connected to the network as well as information on whether each other terminal is a server terminal working as the server or a client terminal working as a client, and the comparison information storage unit stores comparison information used in a server selection process for selecting the server terminal. At least one of the terminals compares pieces of the comparison information stored in the comparison information storage units of the individual terminals through terminal-to-terminal communication and, depending on the result of comparison of the pieces of the comparison information, one of the terminals to which first priority is given by the server selection process is selected to work as the server terminal.

With this arrangement of the invention, it is possible to provide a network system which permits sharing of various kinds of data among a plurality of network terminals connected to the network and flexible reconfiguration of the network in operation without the need to execute a complicated process of server selection and settings.

These and other objects, features and advantages of the invention will become more apparent upon a reading of the following detailed description in conjunction with the accompanying drawings.

DETAILED DESCRIPTION OF THE PREFERRED EMBODIMENT OF THE INVENTION

The invention is now described in detail with reference to the accompanying drawings.

Figure 1:
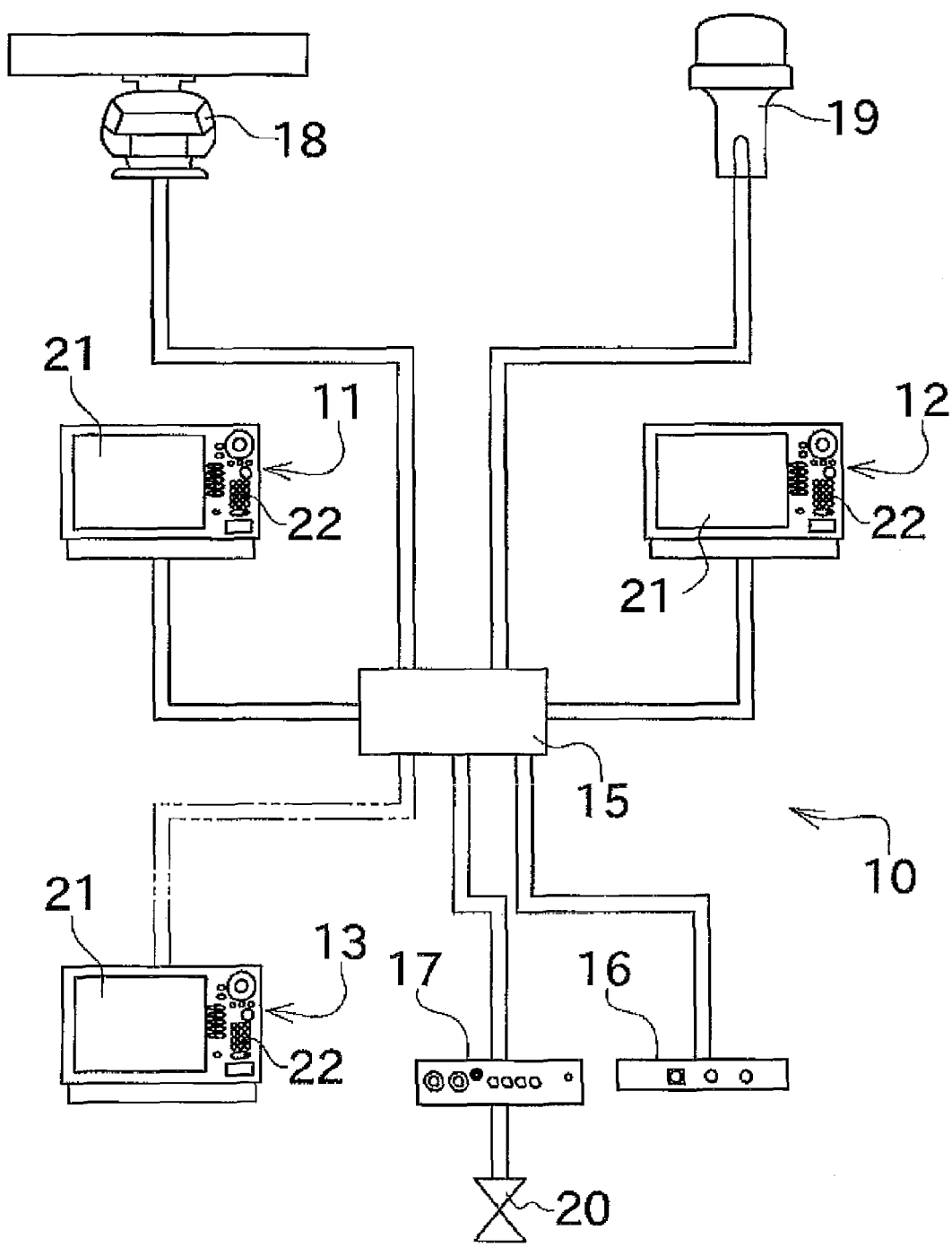
FIG. 1 is a diagram schematically showing the configuration of a network according to a preferred embodiment of the invention.

FIG. 1 is a diagram schematically showing the configuration of a network 10 according to a preferred embodiment of the invention. As shown in FIG. 1, the network 10 includes a pair of onboard terminals 11, 12, a hub 15, a facsimile receiver 16, an echo sounder 17, a radar antenna 18 and a GPS antenna 19 which are installed on a vessel. The two terminals 11, 12, the facsimile receiver 16, the echo sounder 17, the radar antenna 18 and the GPS antenna 19 are connected together via the hub 15. The network 10 constitutes a local area network (LAN) configured by an Ethernet connection, where Ethernet is a registered trademark of Xerox Corporation, USA.

FIG. 1 shows another terminal 13 which is illustrated as if connected to the hub 15 by alternate long and two short dashed lines. This terminal 13 not powered on or not actually connected to the network 10, so that the terminal 13 can not be recognized from the other terminals 11, 12 of the network 10 unless connected thereto and powered on.

The terminals 11, 12, 13 are provided with their respective displays 21 employing liquid crystal displays (LCDs), for example, to show various kinds of information as well as control panels 22, each including a rotary control and keys, for example. A user at each of these terminals 11, 12, 13 can enter commands to make various settings, such as a destination and intended route of own ship and a display range and scale of a picture to be presented on the display 21, through the control panel 22.

The terminals 11, 12, the facsimile receiver 16, the echo sounder 17, the radar antenna 18 and the GPS antenna 19 connected to the network 10 are individually assigned private IP addresses which are specified by the user by operating the individual devices. Alternatively, the individual devices may automatically acquire private IP addresses by using a Dynamic Host Configuration Protocol (DHCP) server which is conventional. The individual devices on the network 10 carry out various kinds of communication by using the private IP addresses. Terminal-to-terminal communication is performed by using Transmission Control Protocol (TCP) or User Datagram Protocol (UDP), for example.

The devices connected to the network 10 are assigned unique host names which permit easy human recognition of the individual devices. The host names can be set by the user by operating the individual devices.

The radar antenna 18 transmits and receives radar signals. The terminals 11, 12 have a capability to produce data on a radar picture based on data obtained from the radar antenna 18 and present the radar picture on the respective displays 21.

The GPS antenna 19 receives GPS satellite signals. The terminals 11, 12 also have a capability to produce own ship position information based on data obtained from the GPS antenna 19 and present the own ship position information on the respective displays 21.

The terminals 11, 12 are configured to function as course plotters which present various kinds of position information on the respective displays 21, the position information including data on a current position and plotted course of own ship as well as data on the destination and intended route of own ship.

Among various kinds of data mentioned above, specific data, such as own ship's destination data, route data and course data, are treated as shared data which are accessible by the individual terminals 11, 12 on the network 10. This means that information on an intended destination entered by the user at the terminal 11, for example, can be displayed on the display 21 of the terminal 12 and reset (overwritten) at the terminal 12 through the control panel 22 thereof, if necessary. Similarly, course data generated by the terminal 12 based on the own ship position information obtained from the GPS antenna 19 can be used by the terminal 11 to present own ship's plotted course on the display 21 thereof.

The facsimile receiver 16 connected to the network 10 receives meteorological information, news and other information transmitted from a facsimile transmitting station in the form of image data and reconstructs original images from the image data. The facsimile images reconstructed from the received image data can be presented on the display 21 of either of the terminals 11, 12 through the network 10.

The echo sounder 17 connected to the network 10 is provided with a transducer 20 which transmits ultrasonic (acoustic) pulse waves and receives echoes from underwater objects (e.g., fish schools). The echo sounder 17 generates image data representing information on detected fish schools. The image data representing the detected fish school information can be presented on the display 21 of either of the terminals 11, 12 through the network 10.

In this embodiment, the terminals 11, 12 connected to the network 10 are configured to be switchable between server mode in which the terminal, whichever selected, works as a server and client mode in which the terminal, whichever selected, works as a client. Specifically, the network 10 of the embodiment is configured in such a way that one of the terminals 11, 12 works as a server and the other of the terminals 11, 12 works as a client. In the network 10 thus configured to provide a client/server platform, the aforementioned specific data, such as own ship's destination data, route data and course data, are shared by the individual terminals 11, 12. In the client/server network 10 of the present embodiment, the terminal which works as the server is automatically selected by a specific process which will be later described in detail.

Figure 2:
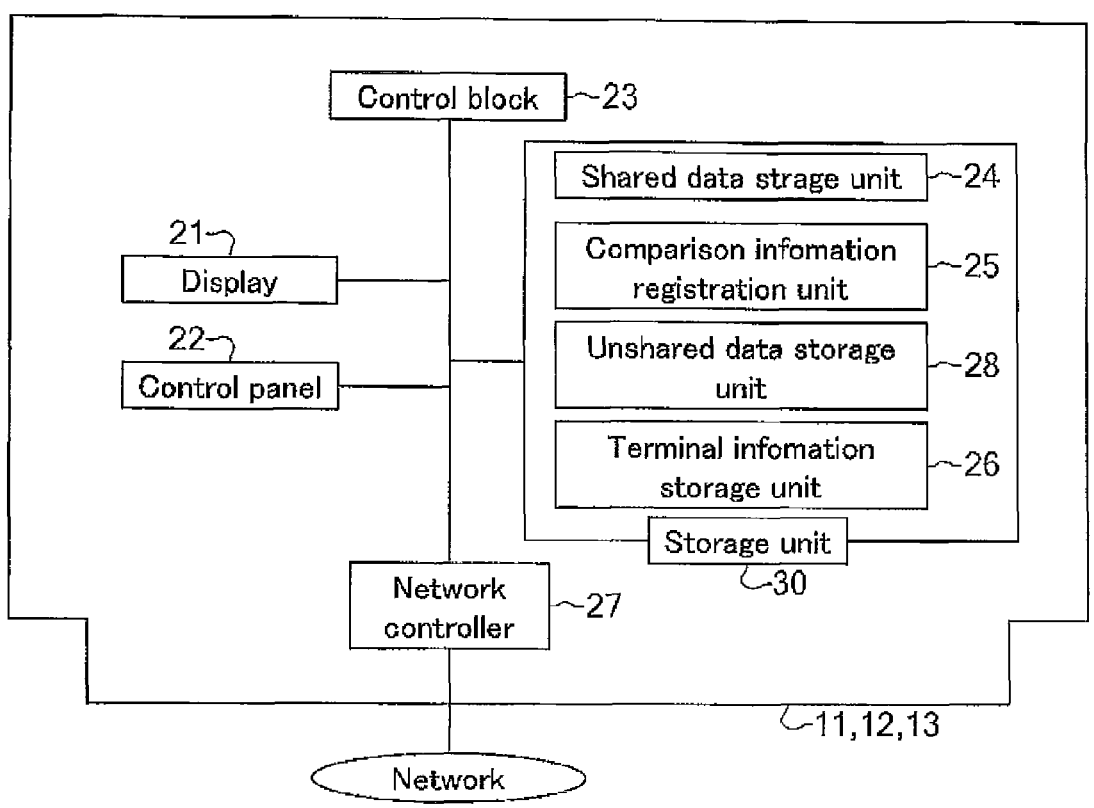
FIG. 2 is a block diagram showing a principal part of the electrical configuration of each terminal of the network of FIG. 1.

FIG. 2 is a block diagram showing a principal part of the electrical configuration of each of the terminals 11, 12, 13. As shown in FIG. 2, each of the terminals 11, 12, 13 includes, in addition to the aforementioned display 21 and control panel 22, a control block 23 for controlling a main part of each terminal, a network controller 27 for establishing a connection of each terminal to the network 10 and a storage block 30 for storing various kinds of information. With this configuration, each terminal transmits and receives various kinds of data through the network 10 under the control of the control block 23 and the network controller 27.

The aforementioned storage block 30 includes a shared data storage unit 24, a comparison information storage unit 25, an unshared data storage unit 28 and a terminal information registration unit 26. The storage block 30 is configured with a random access memory (RAM), a flash memory, optical storage media, a hard disk and/or another type of physical data storage.

The shared data storage unit 24 stores such data as own ship's destination data, route data and course data which are shared by all of the networked terminals through the network 10. The terminal information registration unit 26 registers the host names of the individual terminals connected to the network 10 as well as information on whether each terminal is working as a server or a client. The unshared data storage unit 28 stores such information on settings for each terminal that is not shared by a plurality of terminals. The unshared information of this kind may include a display scale necessary for presenting own ship's plotted course on the display 21, for example.

The comparison information storage unit 25 stores comparison information which is used when determining to which terminal first priority should be given in the later-described process of selecting the terminal to be operated as the server. In this embodiment, the comparison information storage unit 25 of each terminal stores system operating time in terms of a count value in seconds from a point in time when the relevant terminal is powered on, for example. While each terminal is in operation, the system operating time of that terminal stored in the comparison information storage unit 25 thereof is continuously updated to match a current count value with the lapse of time.

In the network 10 thus configured, the individual terminals 11, 12 connected to the network 10 share the data stored in the shared data storage unit 24 through the network 10. As an example, the destination data which is part of the shared data is updated in the below-described fashion. In the following discussion, it is assumed that the terminal 11 is set to act as a server terminal while the terminal 12 is set to act as a client terminal.

If the user varies the previously set destination data at the terminal 11 (server terminal) by operation on the control panel 22 thereof, the control block 23 of the terminal 11 overwrites the previously set destination data with newly entered destination data and transmits a setting change notice to the terminal 12 (client terminal), the setting change notice containing details of the new destination data. Upon receiving the setting change notice from the terminal 11, the terminal 12 varies the data content of the shared data storage unit 24 thereof as indicated by the received setting change notice.

If the user varies the destination data previously set in the terminal 12 (client terminal) by operation on the control panel 22 thereof, on the other hand, the control block 23 of the terminal 12 transmits a setting change request to the terminal 11 (server terminal), indicating that a command requesting a change in destination has been entered by the user at the terminal 12. The setting change request contains new destination data entered by the user. Upon receiving the setting change request, the control block 23 of the terminal 11 overwrites the previous destination data with the new destination data according to the setting change request.

Then, the control block 23 of the terminal 11 immediately returns a setting change notice to the terminal 12, the setting change notice containing the content of the new destination data. Upon receiving the setting change notice from the terminal 11, the terminal 12 varies the data content of the shared data storage unit 24 thereof as indicated by the received setting change notice. The above-described client/server interaction ensures that the shared data stored in the two terminals 11, 12 are always matched one another.

Figure 3:
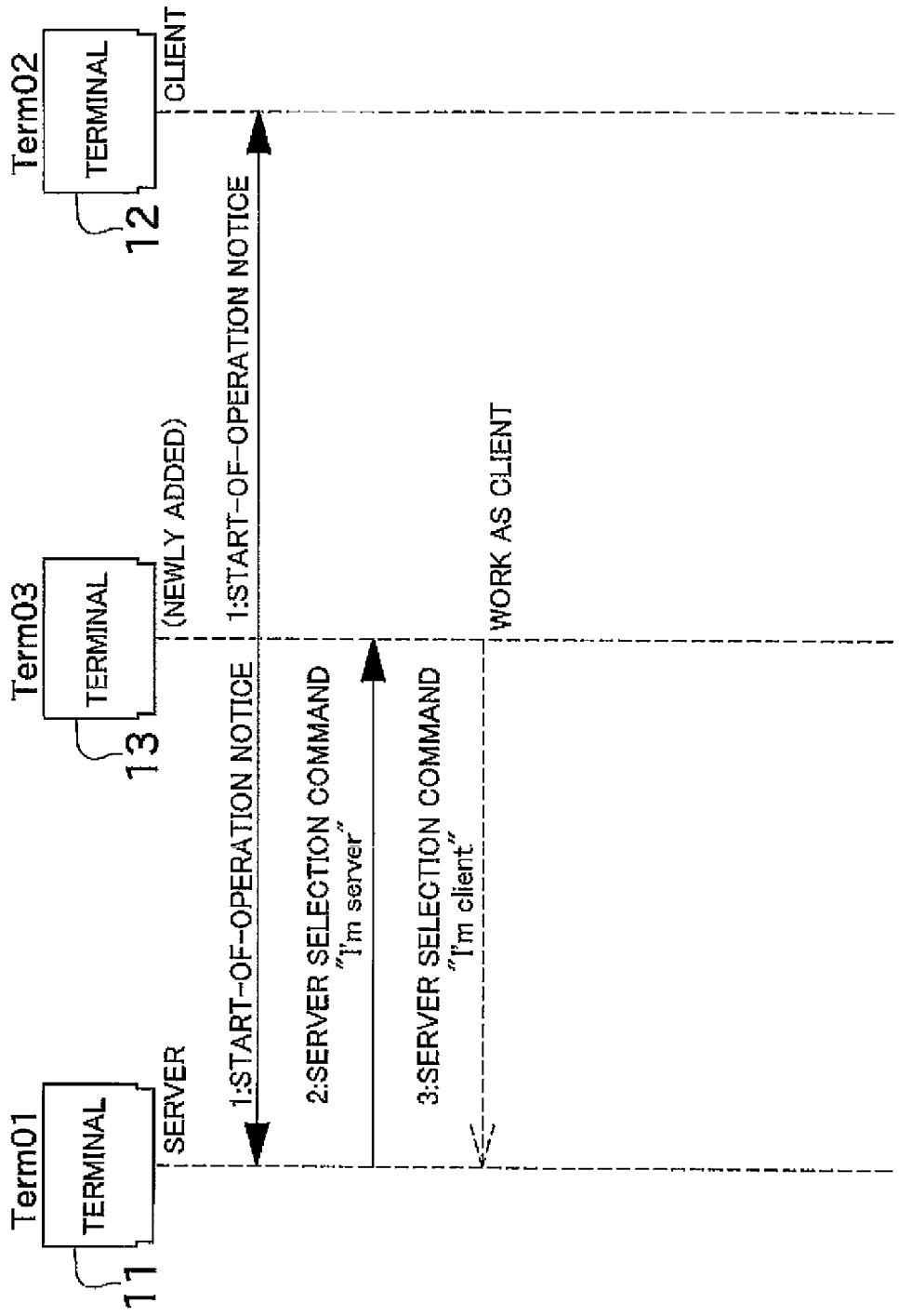
FIG. 3 is a sequence diagram showing a flow of events which occur when a terminal newly connected to the network is designated as a new client terminal.
Figure 4:
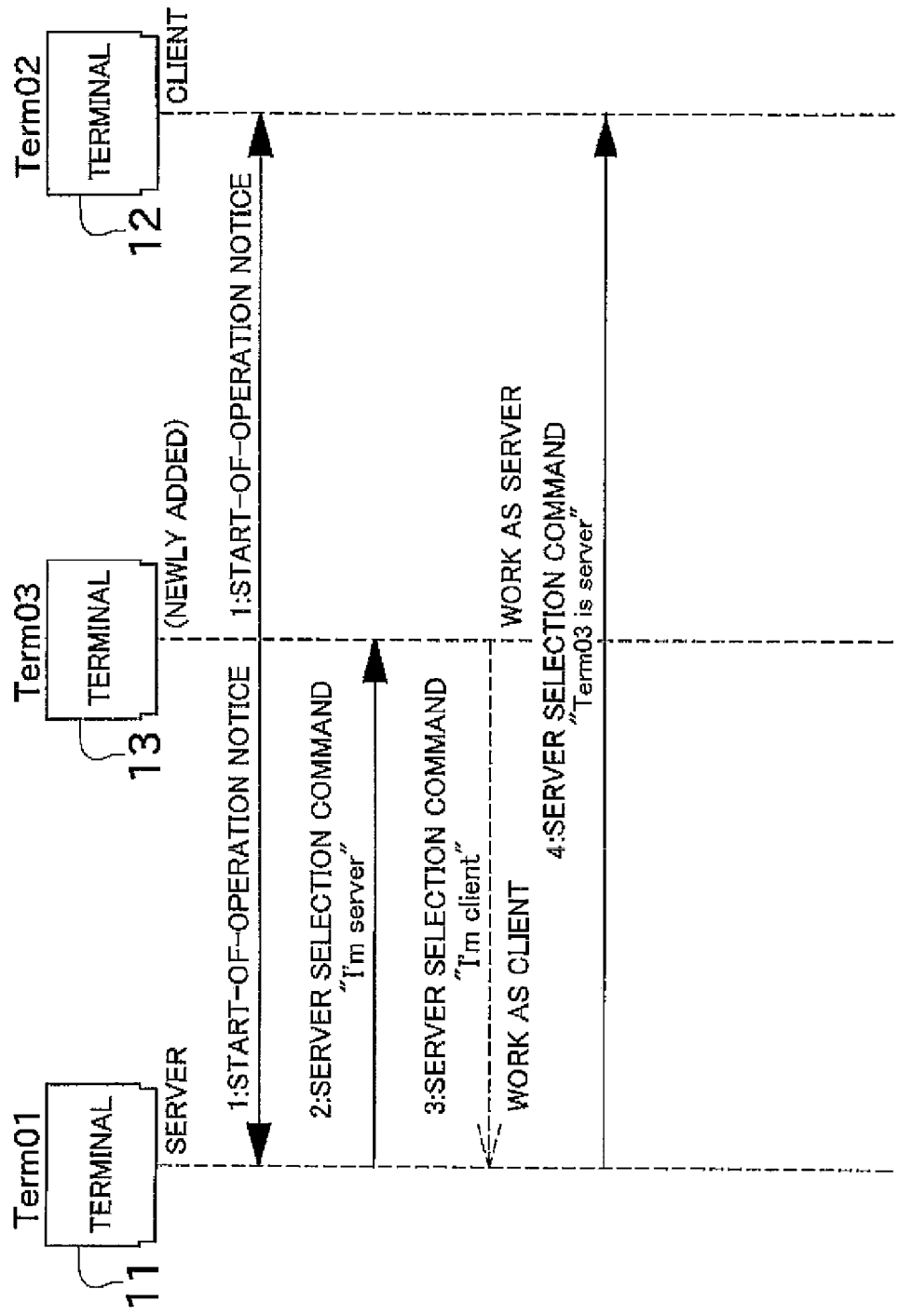
FIG. 4 is a sequence diagram showing a flow of events which occur when a terminal newly connected to the network is designated as a new server.

A process of server selection carried out when the terminal 13 shown in FIG. 1 is newly connected to the network 10 is now described with reference to FIGS. 3 and 4, in which FIG. 3 is a sequence diagram showing a flow of events which occur when the terminal 13 added to the network 10 is designated as a new client terminal, and FIG. 4 is a sequence diagram showing a flow of events which occur when the terminal 13 added to the network 10 is designated as a new server terminal. The following discussion deals with a case where the terminals 11 and 12 have been acting as a server and a client, respectively, up to a point in time when the terminal 13 is connected to the network 10.

The sequence diagrams of FIGS. 3 and 4 each show the three terminals 11, 13, 12, from left to right, which are given unique host names "Term01", "Term02" and "Term03", respectively. Broken lines extending downward from the individual terminals 11, 12, 13 represent the flow of time, arrows shown by solid lines represent directions in which notifying messages are sent, and arrows shown by broken lines represent directions in which responding messages are sent.

Described first with reference to FIG. 3 is an example in which the newly added terminal 13 is set to work as a client. Each of the terminals 11, 12, 13 of the present embodiment is configured to initially work as a server when powered on. Therefore, the terminal 13 temporarily works as a server at first when powered on and connected to the network 10. Upon power-on, the terminal 13 broadcasts a start-of-operation notice to notify all the other terminals connected to the network 10 that the terminal 13 has been newly added to the network 10 (Sequence No. 1). Upon receiving the start-of-operation notice, the terminal 11 which has been working as the server transmits a server selection command containing a statement "I'm server" to notify that the terminal 11 has thus far been working as the server terminal (Sequence No. 2). This server selection command also contains the system operating time stored in the comparison information storage unit 25 of the terminal 11. The terminal 12 which is currently working as a client does not particularly respond to the start-of-operation notice even when the notice is received from the terminal 13.

The terminal 13 which has received the server selection command compares the system operating time of the terminal 11 contained in the server selection command received therefrom with the system operating time stored in the comparison information storage unit 25 of the terminal 13. Then, the terminal 13 decides whether the terminal 13 itself should continue to work as the server or as a client depending on which system operating time is longer.

Shown in FIG. 3 is a case where the system operating time of the terminal 11 which has been working as the server at the point in time when the terminal 13 is connected to the network 10 is judged to be longer than the system operating time stored of the terminal 13. In this case, the terminal 13 switches itself from the server mode in which the terminal 13 works as the server to the client mode in which the terminal 13 works as a client and, then, the terminal 13 registers in the terminal information registration unit 26 thereof a networking condition that the terminal 11 is currently the server terminal. Further, the terminal 13 sends a server selection command containing a statement "I'm client" to the terminal 11 to notify that the terminal 13 will work as a client terminal (Sequence No. 3). When this start-of-operation notice is received, the terminal 11 confirms that the terminal 11 itself can continue to act as the server terminal and thus resumes the role of the server in the network 10.

Described next with reference to FIG. 4 is an example in which the newly added terminal 13 is set to work as a new server. When powered on and connected to the network 10, the terminal 13 temporarily works as the server at first in this case too as mentioned above with reference to FIG. 3. Since Sequence Nos. 1 and 2 of FIG. 4 are exactly the same as Sequence Nos. 1 and 2 of FIG. 3, these Sequences are not discussed again here.

Shown in FIG. 4 is a case where the system operating time of the terminal 13 is judged to be longer than the system operating time of the terminal 11 which has been working as a server at the point in time when the terminal 13 is connected to the network 10. In this case, the terminal 13 sends a server selection command containing a statement "I'm server" to the terminal 11 to notify that the terminal 13 will work as the server terminal (Sequence No. 3).

Upon receiving this server selection command, the terminal 11 switches itself from the server mode to the client mode so that the terminal 13 can take over the role of the server. Also, the terminal 11 registers in the terminal information registration unit 26 thereof a networking condition that the terminal 13 works as the server terminal from now on. Further, the terminal 11 sends a server selection command containing a statement "Term03 is server" to the terminal 12 currently working as a client terminal to notify that the terminal 13 is now the new server terminal (Sequence No. 4). Upon receiving this server selection command, the terminal 13 registers the networking condition that the terminal 13 is currently the server terminal.

The aforementioned server selection commands containing the statements indicating the current networking condition exchanged among the terminals 11, 12, 13 are binary data structured to a specific format. Each server selection command may contain information indicating whether the command is sent as a notifying message or as a responding message as well as information indicating whether the command has been sent from the server terminal or a client terminal. While each server selection command is a binary-formatted message as mentioned above, the server selection commands are expressed in text form in the discussion of the present Specification for ease of understanding. For example, the server selection command indicating that the command has been sent from the server terminal is represented by a text message which reads "I'm server" and the server selection command indicating that the command has been sent from one of the client terminals is represented by a text message which reads "I'm client" as already discussed.

Each server selection command may contain information on the system operating time of the terminal from which the command is sent. Also, if neither a sender nor a recipient of a server selection command is the server, the host name of another terminal serving as the server may be written in the server selection command.

Figure 5:
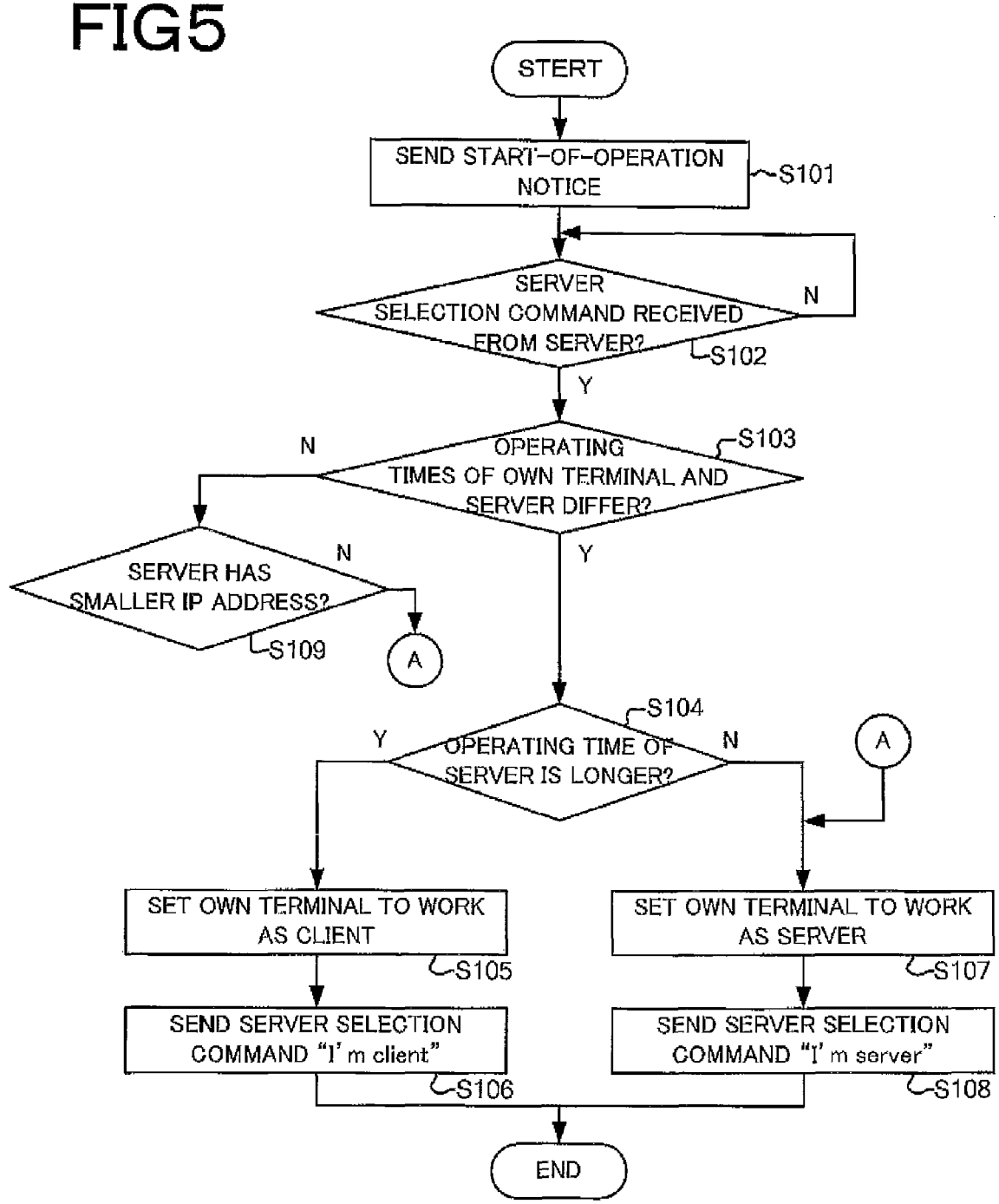
FIG. 5 is a flowchart showing a procedure performed by a terminal when the terminal is newly connected to the network.
Figure 6:
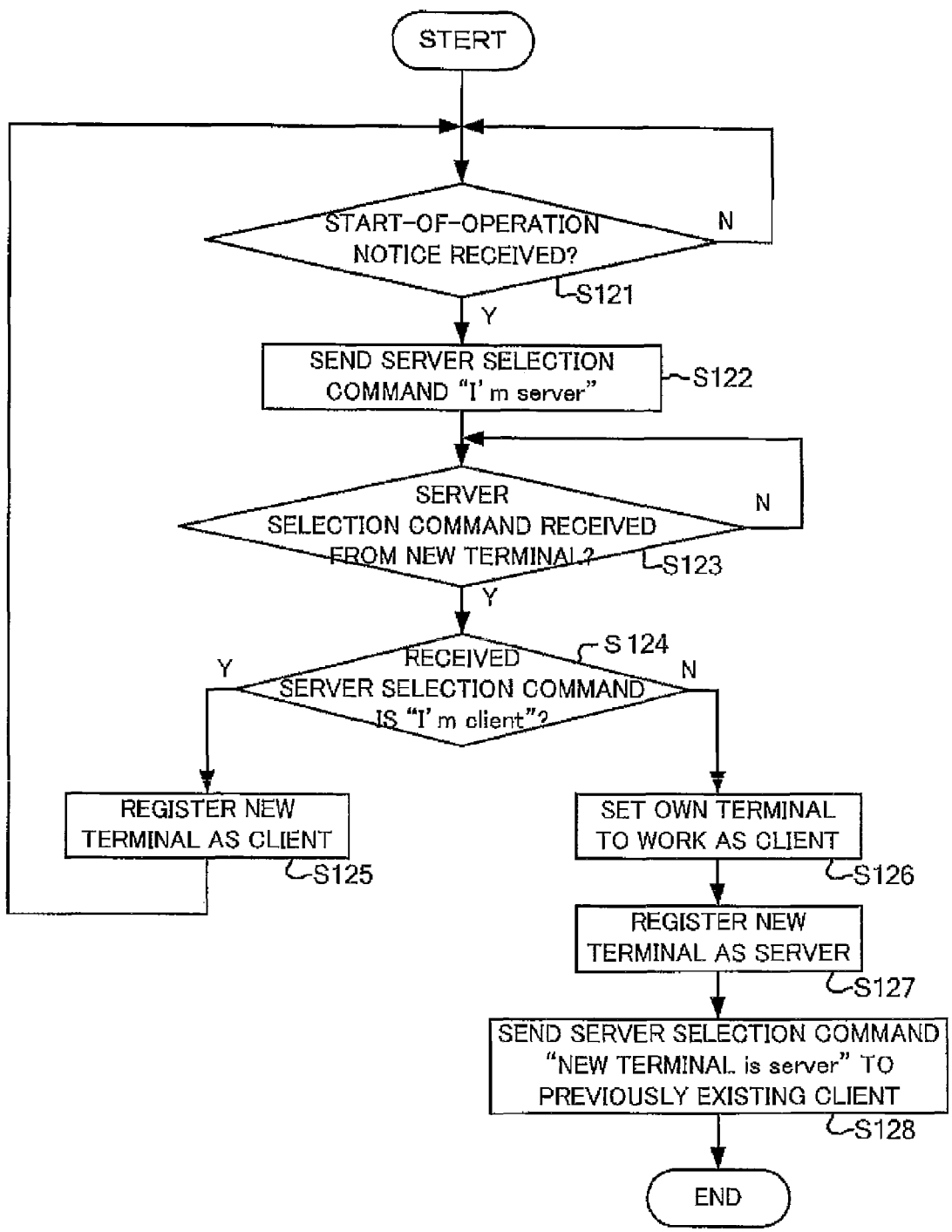
FIG. 6 is a flowchart showing a procedure performed by a terminal which has been acting as the server up to a point in time when another terminal is newly connected to the network.

Now, the server selection process carried out in each terminal is described in detail with reference to FIGS. 5 and 6, in which FIG. 5 is a flowchart showing a procedure performed by the terminal 13 when the terminal 13 shown in FIG. 1 is newly connected to the network 10, and FIG. 6 is a flowchart showing a procedure performed by the terminal 11 which has been acting as the server up to the point in time when the terminal 13 is connected to the network 10.

First, the server selection process carried out by the terminal 13 which has begun to operate in the network 10 is described with reference to FIG. 5. When newly connected to the network 10, the terminal 13 sends a start-of-operation notice to all the other terminals 11, 12 which have already been connected to the network 10 (step S101) and waits for the server selection command stating "I'm server" which will be returned from the server terminal which has received the start-of-operation notice (step S102).

Since the terminal 11 has been acting as the server in the above-described example of FIG. 1, the terminal 11 returns the server selection command stating "I'm server" to the terminal 13. Upon receiving this server selection command, the terminal 13 acquires a system operating time count value from a count portion of the server selection command and compares the system operating time count value of the terminal 11 with a system operating time count value of the terminal 13 stored in the comparison information storage unit 25 thereof to judge whether the two count values differ from each other (step S103).

If the system operating time count values of the terminal 11 and the terminal 13 are judged to differ from each other in step S103, the terminal 13 judges which system operating time is longer (step S104).

If the system operating time of the terminal 11 which has been acting as the server is judged to be longer than that of the terminal 13 in step S104, the terminal 13 sets itself to work as a client (step S105). In this case, the terminal 13 sends the server selection command stating "I'm client" to the terminal 11 (step S106).

If the system operating time of the terminal 13 is judged to be longer than that of the terminal 11 in step S104, on the other hand, the terminal 13 sets itself to work as a new server (step S107) and sends the server selection command stating "I'm server" to the terminal 11 which has thus far been acting as the server (step S108). A situation in which the system operating time of the terminal 13 is longer than that of the terminal 11 could potentially occur if the terminal 13 was powered on much earlier than the point in time when the terminal 13 is connected to the network 10.

If the system operating time count values of the terminal 11 and the terminal 13 are judged to be equal to each other in step S103, the terminal 13 proceeds to below-described step S109. A situation in which the system operating time of the terminal 13 equals that of the terminal 11 could potentially occur if the system operating time is counted in minutes and the two terminals 11, 13 were powered on almost at the same time, for example. Another such situation could potentially occur if the two terminals 11, 13 are configured to be powered on simultaneously in an interlocked fashion.

In step S109, the terminal 13 acquires the IP address of the terminal 11 from the server selection command received therefrom and compares the IP addresses of the two terminals 11, 13 to determine which IP address is larger. In this embodiment, each terminal is configured to compare numerical values of the IP addresses each of which is a 32-bit numerical data string made up of four groups of 8-bit numerals formatted according to Internet Protocol version 4 (IPv4), for example. In the server selection process of the embodiment, priority is given to a terminal having a smaller IP address. If the terminal 11 is assigned an IP address "172.31.3.2" and the terminal 13 is assigned an IP address "172.31.8.1", for example, priority is given to the terminal 11 in the server selection process, because the IP address of the terminal 11 is smaller than that of the terminal 13.

If priority should be given to the terminal 11 with the IP address of the terminal 11 judged to be smaller than that of the terminal 13 in the server selection process of step S109, the terminal 13 sets itself to work as a client (step S105) and sends the server selection command stating "I'm client" to the terminal 11 (step S106). If priority should be given to the terminal 13 with the IP address of the terminal 13 judged to be smaller than that of the terminal 11, on the other hand, the terminal 13 sets itself to work as a new server (step S107) and sends the server selection command stating "I'm server" to the terminal 11 which has thus far been acting as the server (step S108).

Described next with reference to the flowchart of FIG. 6 is the server selection process carried out by the terminal 11 which has been acting as the server up to the point in time when the terminal 13 is newly connected to the network 10.

The terminal 11 continues to work as a normal server unless a start-of-operation notice is received from another terminal (step S121). When the terminal 13 is connected to the network 10, the terminal 13 broadcasts a start-of-operation notice and the terminal 11 receives this start-of-operation notice as previously mentioned.

Upon receiving the start-of-operation notice, the terminal 11 returns the server selection command stating "I'm server" to the terminal 13 which is the sender of the start-of-operation notice to notify that the terminal 11 has been working as the server (step S122), the server selection command containing a description of the system operating time count value of the terminal 11 stored in the comparison information storage unit 25 thereof. The terminal 11 then waits for a server selection command which will be sent from the terminal 13 (step S123).

Upon receiving the aforementioned server selection command stating "I'm server" from the terminal 11, the terminal 13 decides whether the terminal 13 itself should work as the server or as a client and notifies the terminal 11 of the result of decision by sending a server selection command in a manner already discussed with reference to the flowchart of FIG. 5.

Upon receiving the server selection command from the terminal 13, the terminal 11 judges whether the server selection command contains the statement "I'm client" (step S124). If the server selection command received from the terminal 13 contains the statement "I'm client", the terminal 11 registers in the terminal information registration unit 26 thereof a networking condition that the terminal 13 is a client terminal (step S125). Then, the terminal 11 returns to step S121 and continues to work as the server.

If the result of decision in step S124 is in the negative, that is, the server selection command received from the terminal 13 contains the statement "I'm server", and not "I'm server", on the other hand, the terminal 11 switches itself from the server mode to the client mode so that the terminal 13 can take over the role of the server (step S126). Further, the terminal 11 registers in the terminal information registration unit 26 thereof a networking condition that the terminal 13 is currently the server terminal (step S127).

Subsequently, the terminal 11 sends a server selection command to each terminal which has been working as a client terminal (terminal 12) in the network 10 prior to the addition of the new terminal 13 thereto (step S128). This server selection command sent from the terminal 11 contains a statement (e.g., "Term03 is server") indicating that the newly added terminal 13 works as the server terminal from now on. Upon receiving this server selection command, the terminal 12 registers in the terminal information registration unit 26 thereof the networking condition that the terminal 13 is currently the server terminal. Then, the terminal 11 stops acting as the server and begins to behave as a client.

Now, a server selection process carried out when a terminal which has been working as the server is disconnected from the network 10 is described, using an example in which the terminal 11 working as the server among the three terminals 11, 12, 13 connected to the network 10 is disconnected therefrom. It is to be noted that the server selection process carried out when the terminal 11 is disconnected from the network 10 is similarly used in a situation in which the terminal 11 is powered off.

When the terminal 11 which has been working as the server is disconnected from the network 10, the other two terminals 12, 13 communicate with each other and compare the system operating times and the IP addresses of the two terminals 12, 13. Depending on the result of comparison of the system operating times and the IP addresses, one of the terminals 12, 13 having higher priority sends a server selection command stating "I'm server" to the other. For example, if the system operating time of the terminal 12 is longer than that of the terminal 13, the terminal 12 sends the server selection command stating "I'm server" to the terminal 13. A remaining part of the server selection process carried out when the terminal which has been working as the server is disconnected from the network 10 is not described, because the server selection process performed thereafter is essentially the same as the already discussed server selection process carried out when a new terminal is added to the network 10.

As an alternative, the above-described arrangement of the embodiment may be modified in such a way that an order of priority is predetermined based on a comparison of pieces of comparison information stored in the comparison information storage units 25 of the individual terminals and, when one of the terminals is disconnected from the network 10, the server terminal is selected from among the remaining terminals according to the predetermined order of priority.

As thus far described, the terminals 11, 12, 13 of the network 10 according to the preferred embodiment for onboard installation are configured as summarized hereinbelow.

Each of the terminals 11, 12, 13 connected to the network 10 is configured to be switchable between the server mode in which the terminal, whichever selected, works as a server which transmits shared data to clients and the client mode in which the terminal, whichever selected, works as a client which receives the shared data from the server, so that one of the terminals 11, 12, 13 connected to the network 10 works as the server. Each of the terminals 11, 12, 13 is provided with the terminal information registration unit 26 and the comparison information storage unit 25. The terminal information registration unit 26 of each terminal stores information on the other terminals connected to the network 10 as well as information on whether each of the other terminals is a server terminal working as the server or a client terminal working as a client. The comparison information storage unit 25 of each terminal stores information on the system operating time which is used in the process of selecting the server terminal. In the server selection process, each terminal compares system operating time values of the individual terminals through terminal-to-terminal communication and, depending on the result of comparison of the system operating time values, one terminal to which first priority is given works as the server terminal and any other terminal works as a client terminal.

According to this arrangement, one terminal having the longest system operating time is automatically selected as the server terminal. This makes it unnecessary for the user to select the server from among a plurality of terminals by manual operation, thereby relieving the user of work load otherwise required for system setup and maintenance operations. Also, the user need not care whether one terminal is the server or a client. Furthermore, the aforementioned automatic server selection process serves to prevent network failures which may occur due to human errors in system settings, for instance.

If one of the terminals 11, 12, 13 which has been working as the server terminal is disconnected from the network 10, each terminal which has been working as a client terminal compares pieces of comparison information of the terminals still connected to the network 10 through terminal-to-terminal communication and, then, one terminal to which first priority is given begins to work as the server terminal.

According to this arrangement, even when the terminal which has been working as the server terminal is powered off or disconnected from the network 10 due to a failure, for instance, the other terminals still connected to the network 10 carry out terminal-to-terminal communication and the new server terminal is automatically selected. It is therefore unnecessary for the user to select the server by manual operation in this case as well.

As discussed in the aforementioned example of FIG. 4, the terminal 13 is configured such that, when newly connected to the network 10, the terminal 13 communicates with the terminal 11 which has so far been working as the server terminal, compares pieces of comparison information of the two terminals 11, 13, and takes over the role of the server terminal if it is found that first priority is given to the terminal 13 as a result of comparison of the system operating time values.

According to this arrangement, the terminal 13 newly connected to the network 10 communicates with the terminal 11 (server terminal) which could potentially have the longest system operating time at the point in time when the terminal 13 is connected to the network 10. The terminal 13 then determines which one of the two terminals 11, 13 should work as the server terminal according to the result of comparison of the pieces of comparison information. This approach of the invention makes it possible to automatically select one terminal suited to work as the server in a short time through a simple process of terminal-to-terminal communication and mathematical operation.

According to the embodiment, the comparison information stored in the terminal information registration unit 26 of each of the terminals 11, 12, 13 is the system operating time of the relevant terminal and priority is given to one terminal having longer system operating time in the server selection process.

In a case where a terminal is newly added to the network 10 in operation, the terminal which has been working as the server terminal normally has longer system operating time than the newly added terminal. Accordingly, the aforementioned arrangement of the embodiment serves to prevent such a situation that the server terminal is replaced by another terminal each time a change in network configuration occurs due to the addition of a new terminal to the network 10, for example. Typically, the more important a particular terminal, the longer the system operating time of the terminal. It is therefore possible to select the server terminal in a rational way. Additionally, since the server terminal can be selected by a simple comparison of the system operating time values, it is possible to reduce computational complexity and communication complexity at each terminal.

According to the embodiment, the comparison information stored in the terminal information registration unit 26 of each of the terminals 11, 12, 13 is the IP address of the relevant terminal and priority is given to one terminal based on the result of comparison of values of the IP addresses in the server selection process.

Since the server terminal is selected based on the IP addresses which, once assigned to the individual terminals, would rarely be altered, it is possible to prevent such a situation that the server terminal is replaced by another terminal each time a change in network configuration occurs due to the addition of a new terminal to the network 10, for example. Also, since the server terminal can be selected by a simple comparison of the values of the IP addresses, it is possible to reduce computational complexity and communication complexity at each terminal. Furthermore, in general, the more important a particular terminal, the smaller the IP address assigned to that terminal. It is therefore possible to select the server terminal in a rational way if the server selection process is such that higher priority is given to a terminal having a smaller IP address.

According to the embodiment, the comparison information stored in the terminal information registration unit 26 of each of the terminals 11, 12, 13 is a combination of the system operating time and the IP address of the relevant terminal, wherein priority is given to one terminal having longer system operating time and, if a plurality of terminals have equally longer system operating time than any other terminal, priority is given to one terminal based on the result of comparison of values of the IP addresses in the server selection process.

According to this arrangement, the server terminal is selected based on the IP addresses it a plurality of terminals have the same system operating time. This approach makes it possible to select the server terminal in an appropriate fashion at all times.

According to the embodiment, each of the terminals 11, 12, 13 is provided with the unshared data storage unit 28 for storing data which need not be shared by the individual terminals.

This arrangement permits each terminal to store information and settings which are intended to be used only by the relevant terminal. For example, if one terminal is frequently used by a particular user, the user may enter desired settings and use that terminal in a flexible fashion without giving attention to the influence to the other terminals.

While the invention has thus far been described with reference to the preferred embodiment thereof, the above-described configuration of the embodiment may be modified in various ways. Some examples of such modification of the embodiment are described hereinbelow.

While the order of priority is determined based on the system operating time and the IP address of each terminal in the server selection process of the foregoing embodiment, this arrangement may be modified such that the server terminal is selected based on other kind of information which may be registered in a database provided in each terminal, for example. In this case, information used as the comparison information may be the type of database, time of last update of the database or an update serial number which is incremented each time the information in the database is updated, for example. The database provided in one terminal may be for storing data contents of a destination, an intended route, waypoints and a plotted course of own ship, for example.

The above-described arrangement of the embodiment may be modified such that priority is given to a terminal having shorter system operating time, and not longer system operating time, in the server selection process. Also, the arrangement of the foregoing embodiment may be modified such that priority is given to a terminal having a larger IP address, and not a smaller IP address.

Furthermore, the configuration of the network 10 of the foregoing embodiment may be modified so as not to include the facsimile receiver 16 or the echo sounder 17, or to include other kinds of devices. Also, the number of terminals connected to the network 10 may be altered as appropriate.

In the foregoing embodiment, the server terminal is selected based on the result of comparison of the system operating times of the individual terminals and, then, if a plurality of terminals have the same system operating time, based on the result of comparison the IP addresses of the individual terminals. According to the invention, however, the server selection process need not necessarily be such a two-step comparison process. For example, the server selection process may be modified to include only a step of comparing the system operating times or only a step of comparing IP addresses of the individual terminals. Also, the server selection process may be a process including three or more steps of comparisons with the addition of one or more kinds of comparison information.

As previously discussed with reference to FIGS. 3 and 4, the terminal 12 which has been working as a client up to the point in time when the terminal 13 is newly connected to the network 10 does not particularly respond to the start-of-operation notice received from the terminal 13 in the foregoing embodiment. This arrangement of the embodiment may be modified such that both of the terminals 11, 12 respond to the start-of-operation notice received from the terminal 13 by individually transmitting the server selection command, so that the terminal 13 can compare the system operating times of all the terminals 11, 12, 13 including the terminal 13 itself and select one terminal having the longest system operating time (and thus the highest priority in the server selection process) as the server terminal from among the three terminals 11, 12, 13.

Furthermore, in the above-described network 10 of the invention, contents of the shared data are not limited to such data as own ship's destination data, route data and course data mentioned above, but may be varied to include other kinds of data.

What is claimed is:

1. A terminal which is configured for connection to a network together with at least one other terminal having a like configuration and for switching between server mode in which said terminal works as a server which transmits shared data to a client and client mode in which said terminal works as a client which receives the shared data from the server, said terminal comprising:
    a terminal information registration unit for storing information on said other terminal connected to the network as well as information on whether said other terminal is a server terminal working as the server or a client terminal working as a client;
    a shared data storage unit for storing shared data which is shared by said terminals in the network and for updating said shared data such that when shared data is updated on any other terminal in the network, the same update is automatically made to the stored shared data on the terminal; and
    a comparison information storage unit for storing comparison information used in a server selection process for selecting the server terminal from among the all terminals connected to the network, where the all terminals connected to the network include at least one server terminal and at least one client terminal;
    wherein at least one of said terminals compares pieces of the comparison information stored in said comparison information storage units of said individual terminals through terminal-to-terminal communication and, depending on a result of comparison of the pieces of the comparison information, one of said terminals to which first priority is given by the server selection process works as the server terminal and the other terminal works as a client terminal.

2. The terminal according to claim 1, wherein if one of said terminals which has been working as the server terminal is disconnected from the network, said terminal which has been working as a client terminal compares the pieces of the comparison information stored in said comparison information storage units of said individual terminals still connected to the network through terminal-to-terminal communication and, then, one of said terminals to which priority is given by the server selection process switches from the client mode to the server mode to work as the server terminal.

3. The terminal according to claim 1, wherein if said terminal which has not been connected to the network is newly connected thereto, said terminal communicates with the terminal which has been working as the server terminal on the network, compares the pieces of the comparison information stored in said comparison information storage units of said individual terminals and takes over as the server terminal if it is found that priority is given to said newly connected terminal by the server selection process.

4. The terminal according to claim 1, wherein the comparison information is operating time of each of said terminals and priority is given to one of said terminals having longer operating time than any other terminal.

5. The terminal according to claim 1, wherein the comparison information is an IP address of each of said terminals and priority is given to one of said terminals based on the result of comparison of IP address values.

6. The terminal according to claim 1, wherein the comparison information is a combination of operating time and IP address of each of said terminals, and wherein priority is given to one of said terminals having longer operating time than any other terminal and, if a plurality of terminals have equally longer operating time than any other terminal, priority is given to one of said terminals based on the result of comparison of IP address values.

7. The terminal according to claim 1 further comprising an unshared data storage unit for storing data which need not be shared by said individual terminals.

8. A network system to which a plurality of terminals are connected, each of said terminals being configured to be connectable to a network and switchable between server mode in which the relevant terminal works as a server which transmits shared data to a client and client mode in which the relevant terminal works as a client which receives the shared data from the server, wherein only one of said terminals is selected to work as the server, each of said terminals comprising:
    a terminal information registration unit for storing information on each other terminal connected to the network as well as information on whether each other terminal is a server terminal working as the server or a client terminal working as a client;
    a shared data storage unit for storing shared data which is shared by said terminals in the network and for updating said shared data such that when shared data is updated on any other terminal in the network, the same update is automatically made to the stored shared data on the terminal; and a comparison information storage unit for storing comparison information used in a server selection process for selecting the server terminal from among the all terminals connected to the network, where the all terminals connected to the network include at least one server terminal and at least one client terminal;

wherein at least one of said terminals compares pieces of the comparison information stored in said comparison information storage units of said individual terminals through terminal-to-terminal communication and, depending on a result of comparison of the pieces of the comparison information, one of said terminals to which first priority is given by the server selection process is selected to work as the server terminal.

* * * * *